United States Patent
Teague

(10) Patent No.: US 11,359,654 B2
(45) Date of Patent: Jun. 14, 2022

(54) HERMAPHRODITIC LATCHING SLIDE CONNECTOR

(71) Applicant: Terrell Teague, Fairport, NY (US)

(72) Inventor: Terrell Teague, Fairport, NY (US)

( * ) Notice: Subject to any disclaimer, the term of this patent is extended or adjusted under 35 U.S.C. 154(b) by 227 days.

(21) Appl. No.: 15/929,441

(22) Filed: May 2, 2020

(65) Prior Publication Data
US 2020/0347860 A1    Nov. 5, 2020

Related U.S. Application Data

(60) Provisional application No. 62/843,394, filed on May 4, 2019.

(51) Int. Cl.
*F16B 2/18*    (2006.01)
*F16B 5/00*    (2006.01)

(52) U.S. Cl.
CPC ............... *F16B 2/18* (2013.01); *F16B 5/002* (2013.01); *F16B 5/0028* (2013.01)

(58) Field of Classification Search
CPC .... F16B 2/10; F16B 2/18; F16B 2/185; F16B 5/002; F16B 5/0028; F16B 5/0084; F16B 5/0092; F16B 5/0621; Y10T 403/591; Y10T 403/595; Y10T 403/599; Y10T 403/60; Y10T 403/602; Y10T 403/608; Y10T 403/61; Y10T 403/70; Y10T 403/7075
USPC ......... 403/322.1, 322.4, 325, 326, 327, 330, 403/331, 345, 376
See application file for complete search history.

(56) References Cited

U.S. PATENT DOCUMENTS

| | | | | |
|---|---|---|---|---|
| 2,884,296 A | * | 4/1959 | Meilinger | F16B 12/00 403/345 |
| 4,900,065 A | * | 2/1990 | Houck | F16L 37/56 285/73 |
| 4,922,586 A | * | 5/1990 | Robson | A44B 19/16 24/580.11 |
| 5,118,303 A | * | 6/1992 | LeBaron | H01R 24/84 439/744 |
| 5,940,560 A | * | 8/1999 | De Marchi | G02B 6/3849 385/58 |
| 6,786,372 B2 | * | 9/2004 | Enkerlin | A45F 5/02 455/100 |
| 7,153,170 B1 | * | 12/2006 | Fabian | H01R 24/84 439/295 |
| 7,722,374 B2 | * | 5/2010 | Hillis | H01R 13/6273 439/285 |

(Continued)

FOREIGN PATENT DOCUMENTS

EP         2741385 A2 *  6/2014  .............. F16L 3/222

*Primary Examiner* — Josh Skroupa

(57) ABSTRACT

A mechanical sliding connector that mates to an identical mechanical connector by a sliding action. The connector can be slid into another connector or another connecter can slide on to it, allowing the connectors to connect in either direction. The connector features a latching mechanism that engages with no interaction required by the operator other than sliding the connectors together. Unlatching the connectors can be accomplished by unlatching either of the connectors and sliding them apart. The connector latch resets automatically after it's disconnected enabling it to be ready for another connection without user action. This feature along with a latch locking feature provides for easy one hand operation.

2 Claims, 19 Drawing Sheets

(56) References Cited

U.S. PATENT DOCUMENTS

| 7,784,755 | B1* | 8/2010 | Johnson | E04B 9/006 |
| | | | | 403/326 |
| 10,416,395 | B2* | 9/2019 | Mathews | H01R 24/84 |
| 11,086,083 | B2* | 8/2021 | Mathews | G02B 6/383 |

* cited by examiner

HERMAPHRODITIC LATCHING SLIDE CONNECTOR

CROSS-REFERENCE TO RELATED APPLICATIONS

This application claims the benefit of provisional patent application Ser. No. 62/843,394 filed 2019 May 4 by the present inventor.

BACKGROUND-PRIOR ART

The following is a tabulation of some prior art that presently appears relevant:

U.S. Patents

| Pat. No. | Kind Code | Issue Date | Patentee |
|---|---|---|---|
| 7,722,374 | B2 | 2010 May 25 | W. Daniel Hillis Luke Khanlian |
| 6,786,372 | B2 | 2004 Sep. 4 | E. Michael Enkerlin Ron L. Lawrence |
| 4,900,065 | A | 1990 Feb. 13 | Douglas L. Houck |
| 5,118,303 | A | 1992 Jun. 2 | Jame B. LeBaron David 0. Gallusser |

Foreign Patents

| Country | Pat. No. | Issue Date |
|---|---|---|
| EP | EP2741385B1 | 2019 Mar. 6 |

At present time there are many types of hermaphroditic mechanical connectors in use. One very common being the connector used to join railroad cars sometimes referred to as the handshake connector. One major advantage of a hermaphroditic connector is that both sides of the connector are identical therefore eliminating the need for two different types of connectors, such as a male and female connector. Much of the prior art is concentrated around electrical and pneumatic connectors such as U.S. Pat. No. 7,722,374 which is a twist type connector and U.S. Pat. No. 4,900,065 that features opposing stabs that interlock. U.S. Pat. No. 5,118,303 is an example of a pneumatic or hydraulic hose connection that utilizes offset L shaped stand-offs that when faced to each and twisted provide a mechanical connection that can be made leak tight.

The use of hermaphroditic connectors is not as prevalent in the use of mounting equipment or connecting attachments such as containers, video cameras, carrying bags, or equipment clips. Prior art in these situations generally doesn't involve a hermaphroditic connector and instead utilizes a gender-based connector wherein one side is considered male and the other female. U.S. Pat. No. 6,786,372 is an example of latching clip that can be locked into place, but consists of 2 different genders. These types of mechanical connectors have the disadvantage that two assemblies cannot be connected together if they have the same gender. Furthermore, prior art mounting connectors whether hermaphroditic or gender based, connect and lock in one direction, then disconnect in the reverse direction. In other words, the mating direction is one way, engaging the connectors in one way engages it, and the opposite direction disengages it.

In my search of prior art, I have not found any device that allows for a mechanical connector to be connected to another mechanical connector of the same design (hermaphroditic) which can be latched together or unlatched apart in either direction.

SUMMARY

In accordance with one embodiment a sliding mechanical connector that can connect to an identical mechanical connector by sliding them together in either direction and latched. Furthermore, can be disengaged by unlatching one of the two connectors and pulling them apart. The connectors can be disengaged in either direction determined by which connector latch is unlatched. Upon disengagement, the latching mechanism automatically resets and is ready for the next connection operation. The aforementioned connector can be attached by any means to an item or built into the design of an item to enable that item to be connected to another item utilizing the advantages of this connector.

DRAWINGS-FIGURES

In the drawings, closely related figures have the same number but different alphabetic suffixes.

Figure 3:
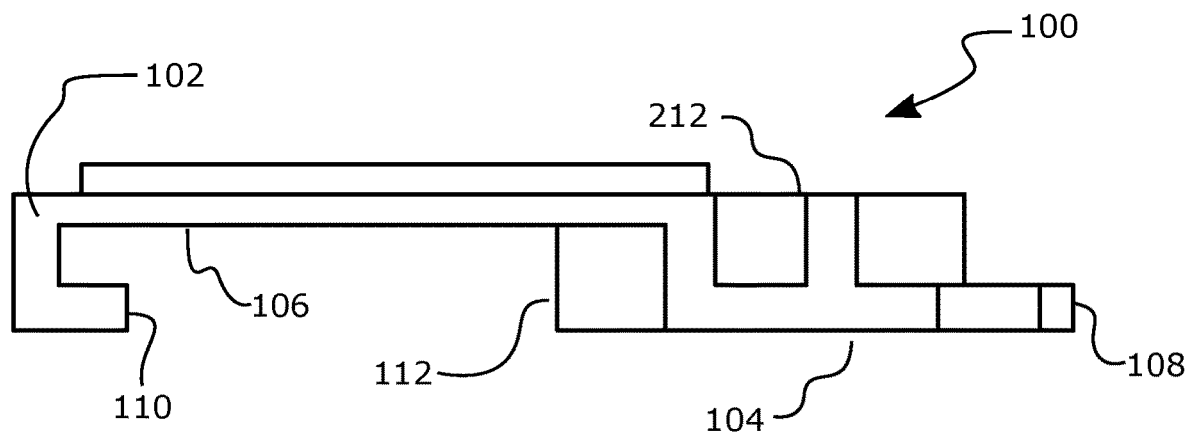

FIG. 3 bottom view of the first embodiment.

Figure 3A:
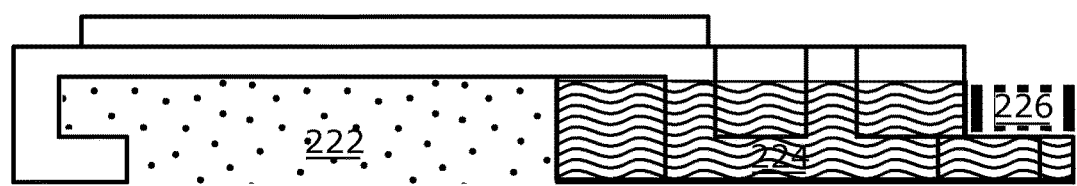

FIG. 3A shows view of the first embodiment track profile and rail profile.

Figure 4A:
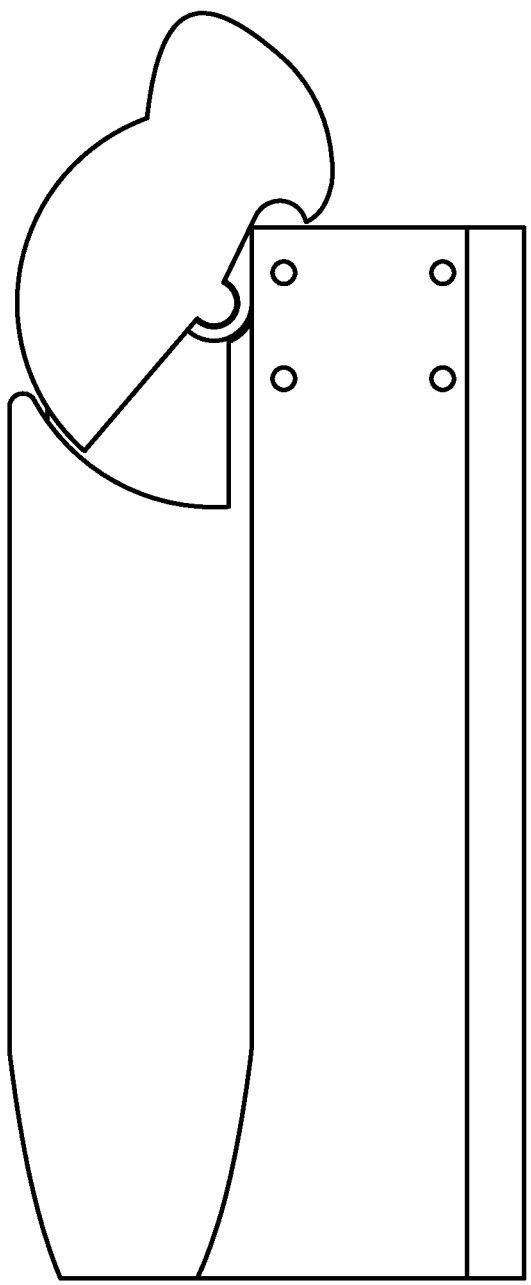

FIG. 4A shows the front of the first embodiment in the latched position.

Figure 4B:
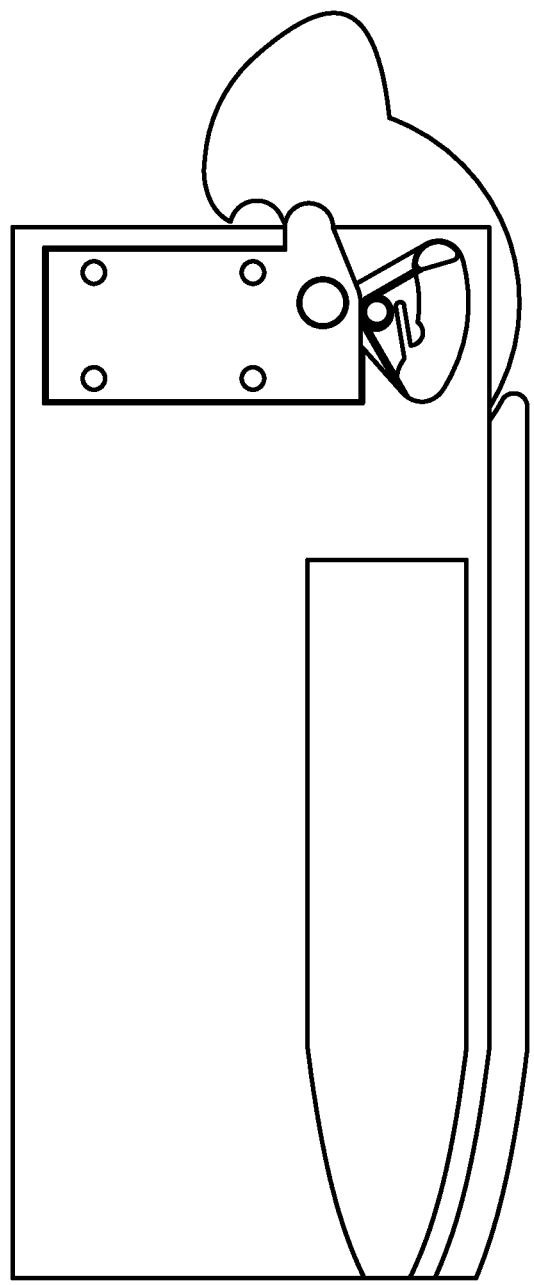

FIG. 4B shows the back of the first embodiment in the latched position.

Figure 5A:
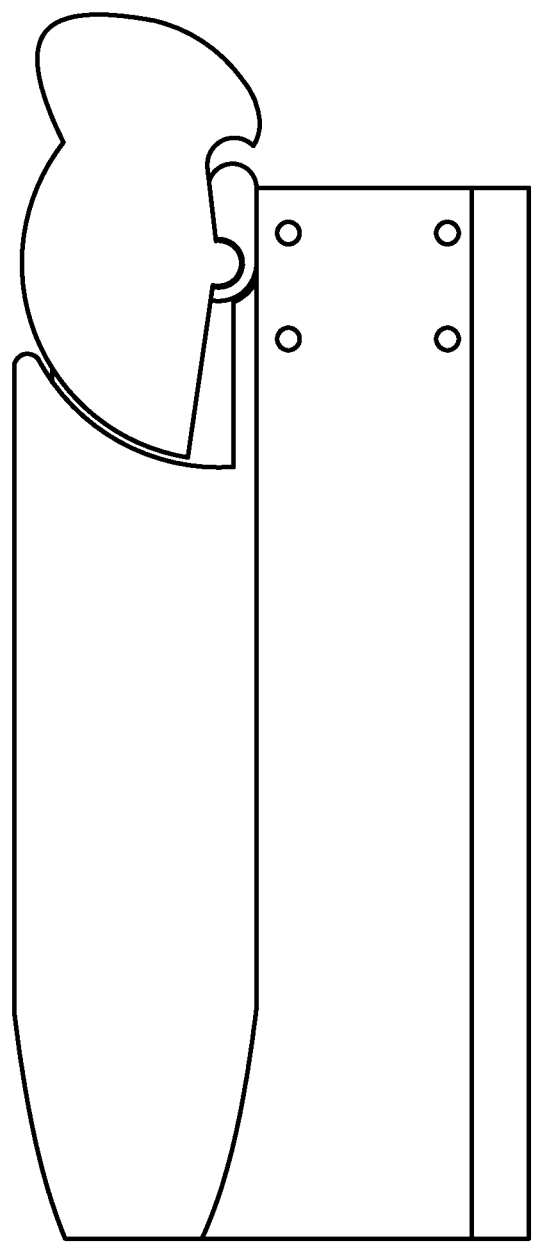

FIG. 5A shows the front of the first embodiment in the unlatched position.

Figure 5B:
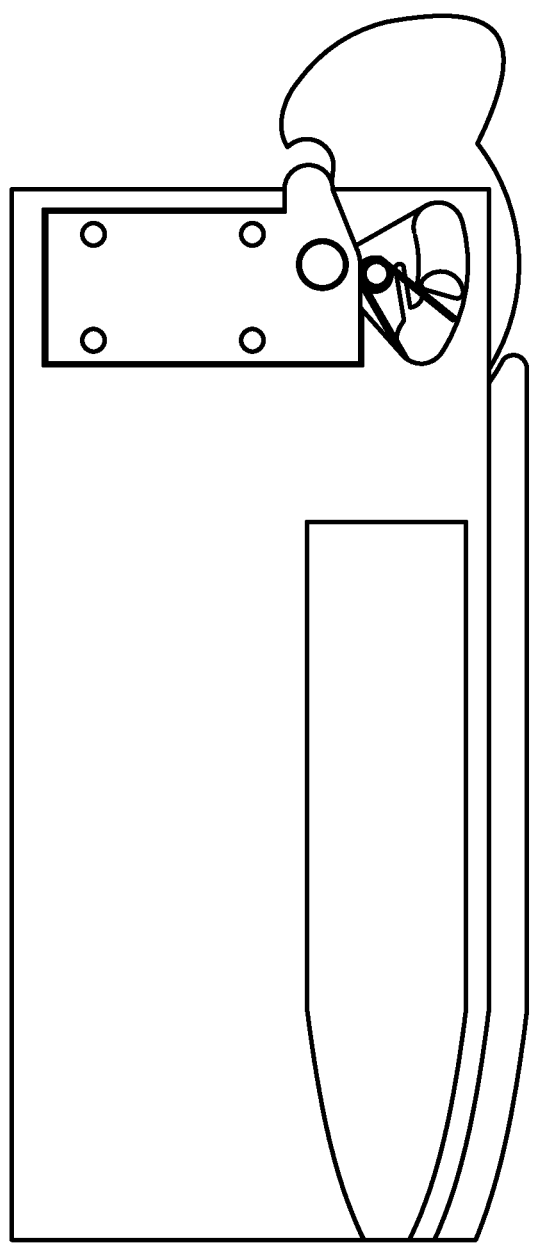

FIG. 5B shows the back of the first embodiment in the unlatched position.

Figure 6A:
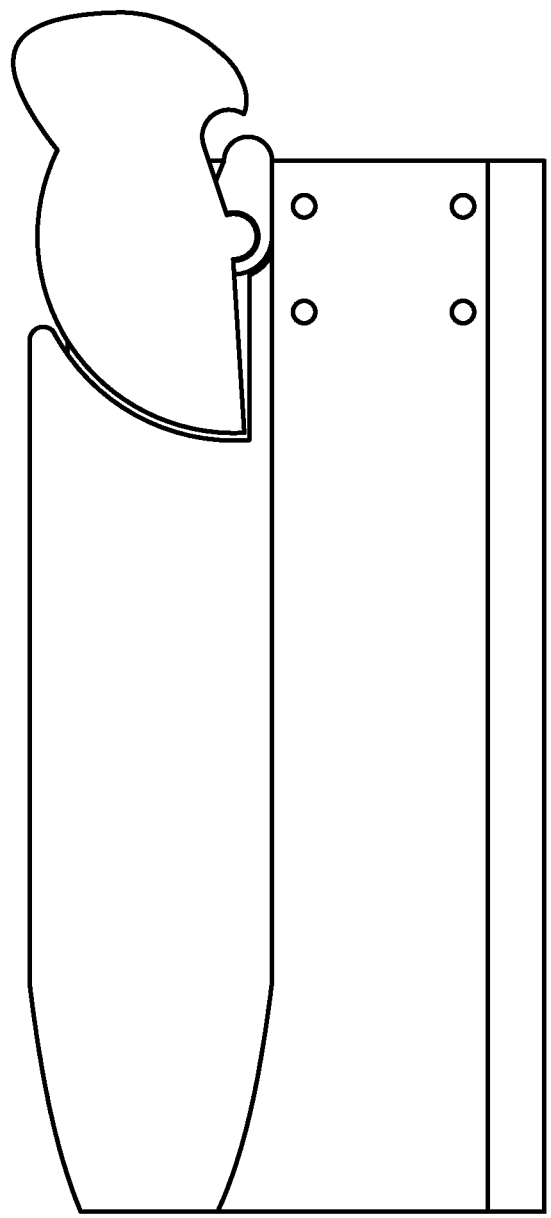

FIG. 6A shows the front of the first embodiment in the unlatched locked position.

Figure 6B:
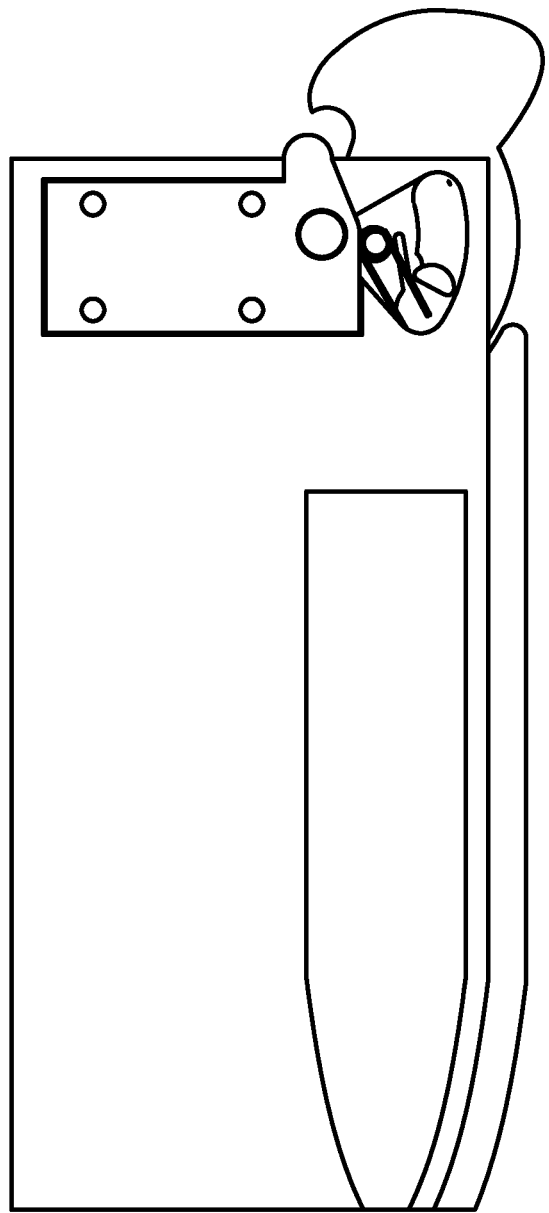

FIG. 6B shows the back of the first embodiment in the unlatched locked position.

Figure 7:
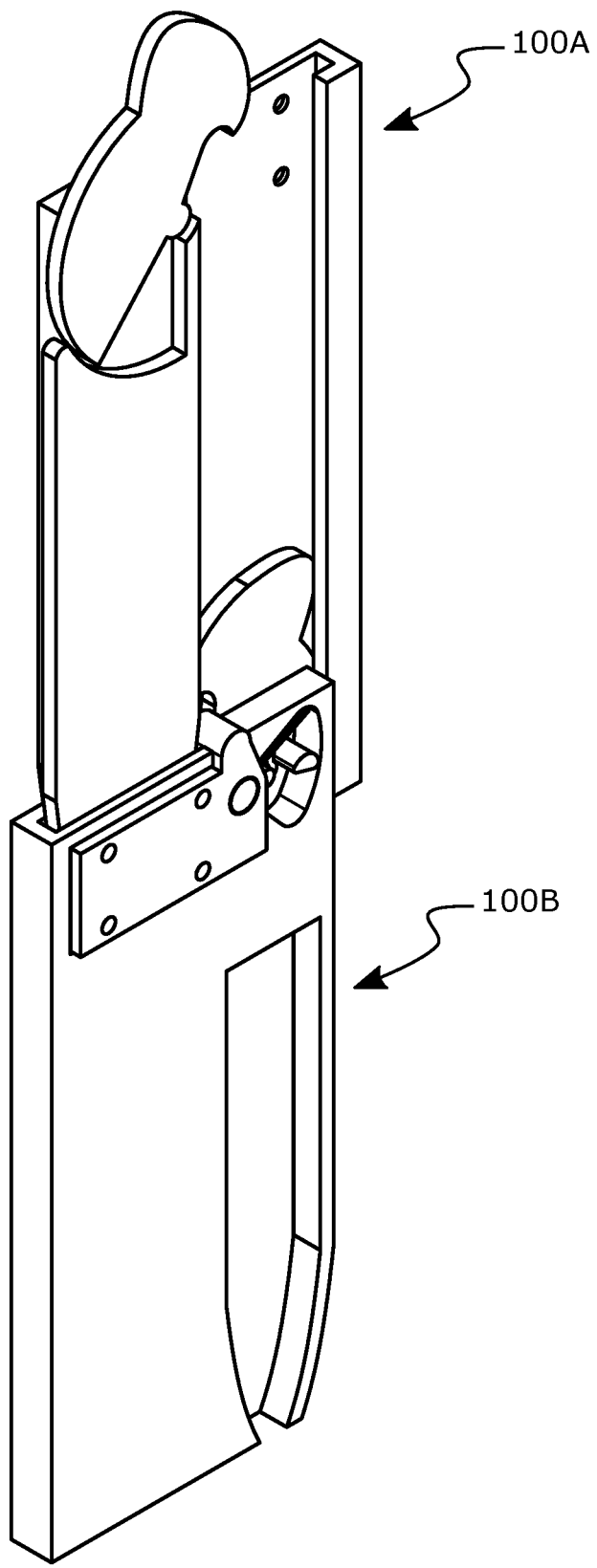

FIG. 7 shows the leading of one slide connector of the first embodiment into another.

Figure 8:
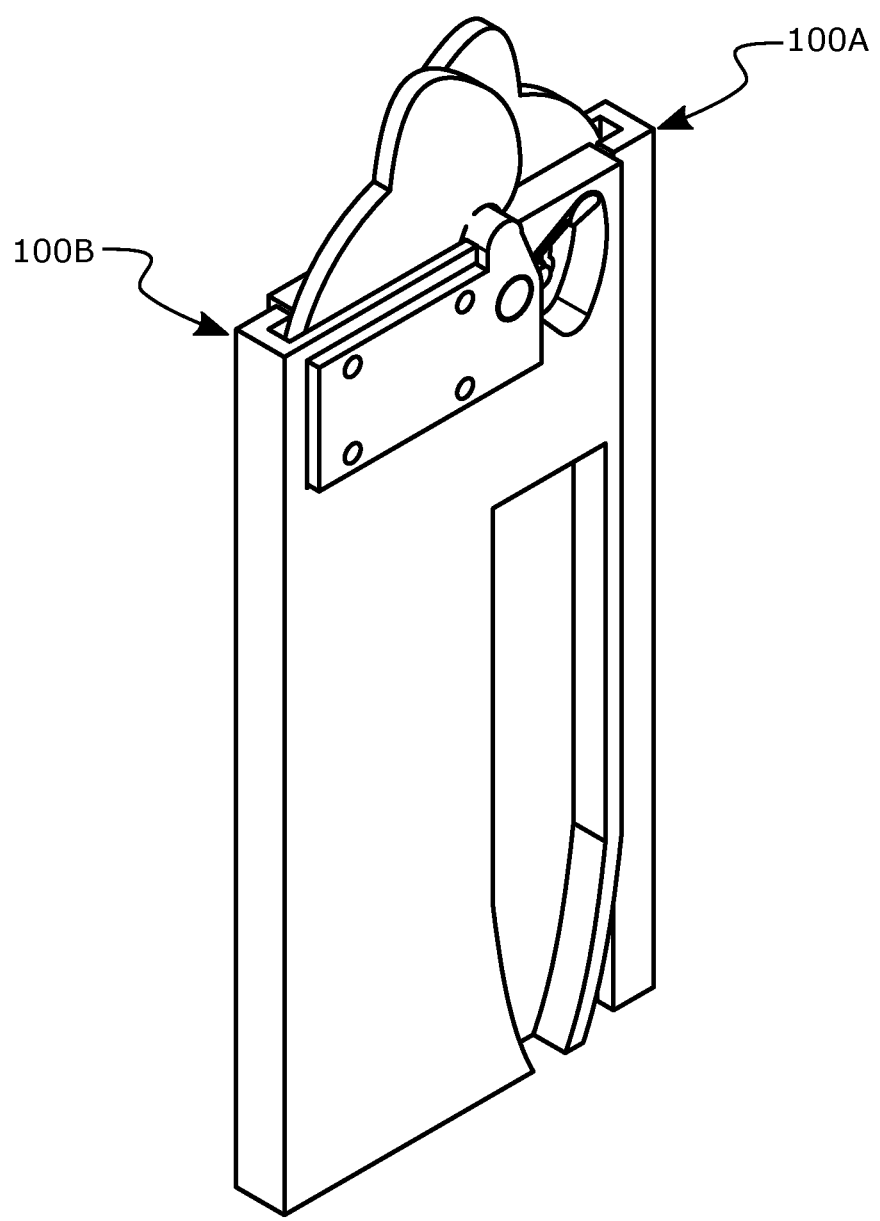

FIG. 8 shows two slide connectors of the first embodiment latched into each other.

Figure 9:
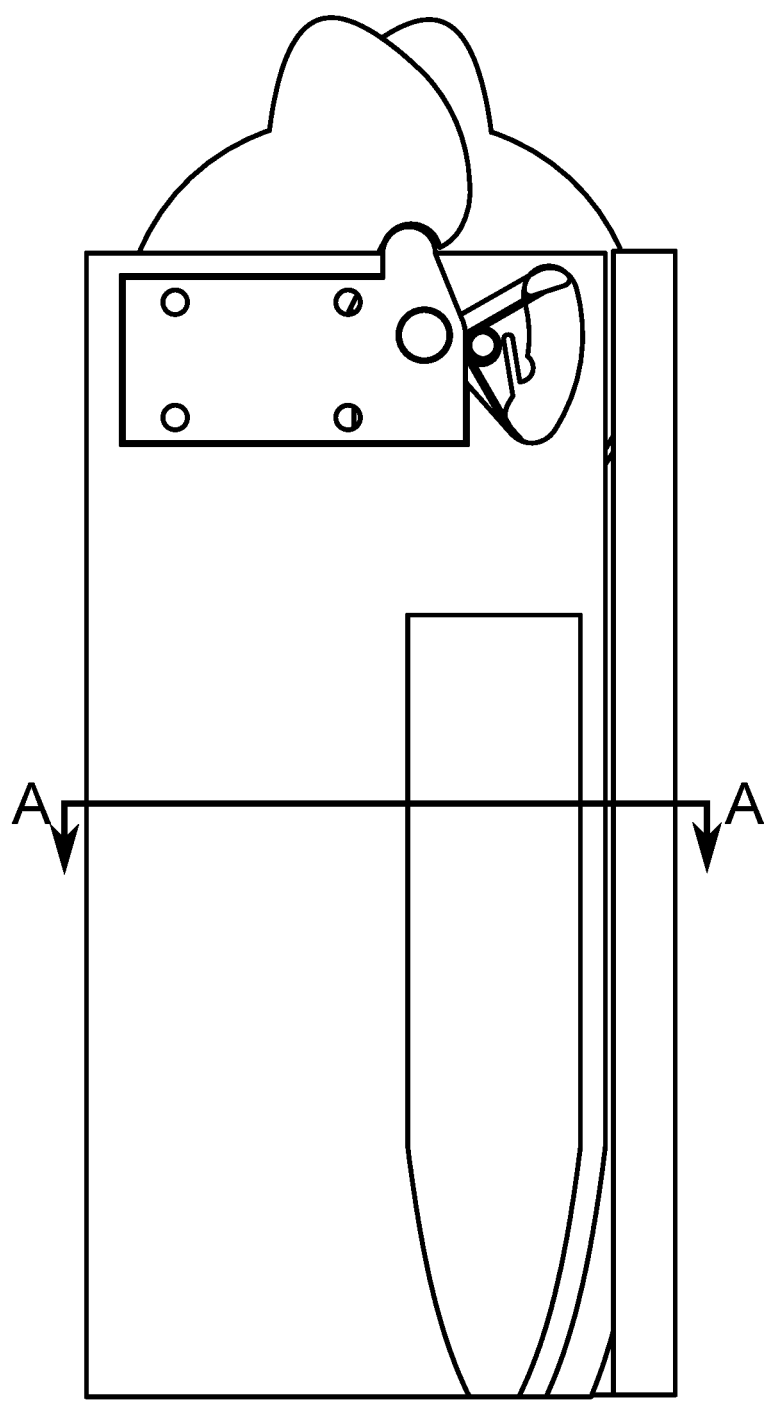

FIG. 9 shows two slide connectors of the first embodiment latched into each other from the back of one slide connector.

Figure 9A:
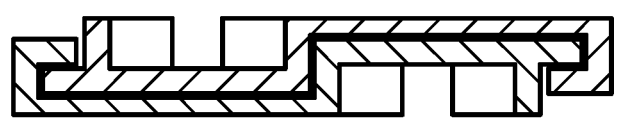

FIG. 9A shows the cross section of two slide connectors of the first embodiment latched into each other on section AA.

Figure 10:
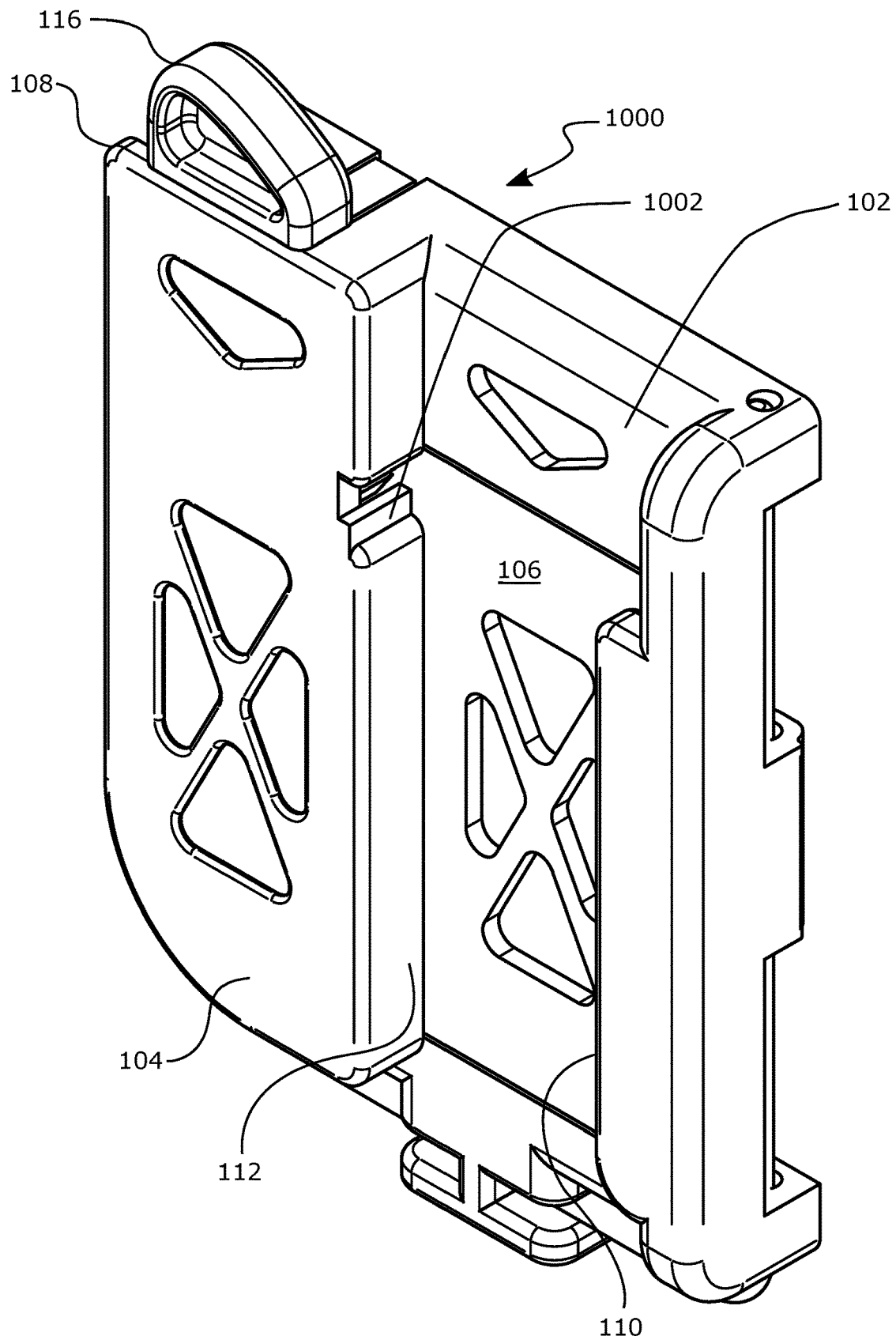

FIG. 10 shows an isometric view from the top of the second embodiment.

Figure 11:
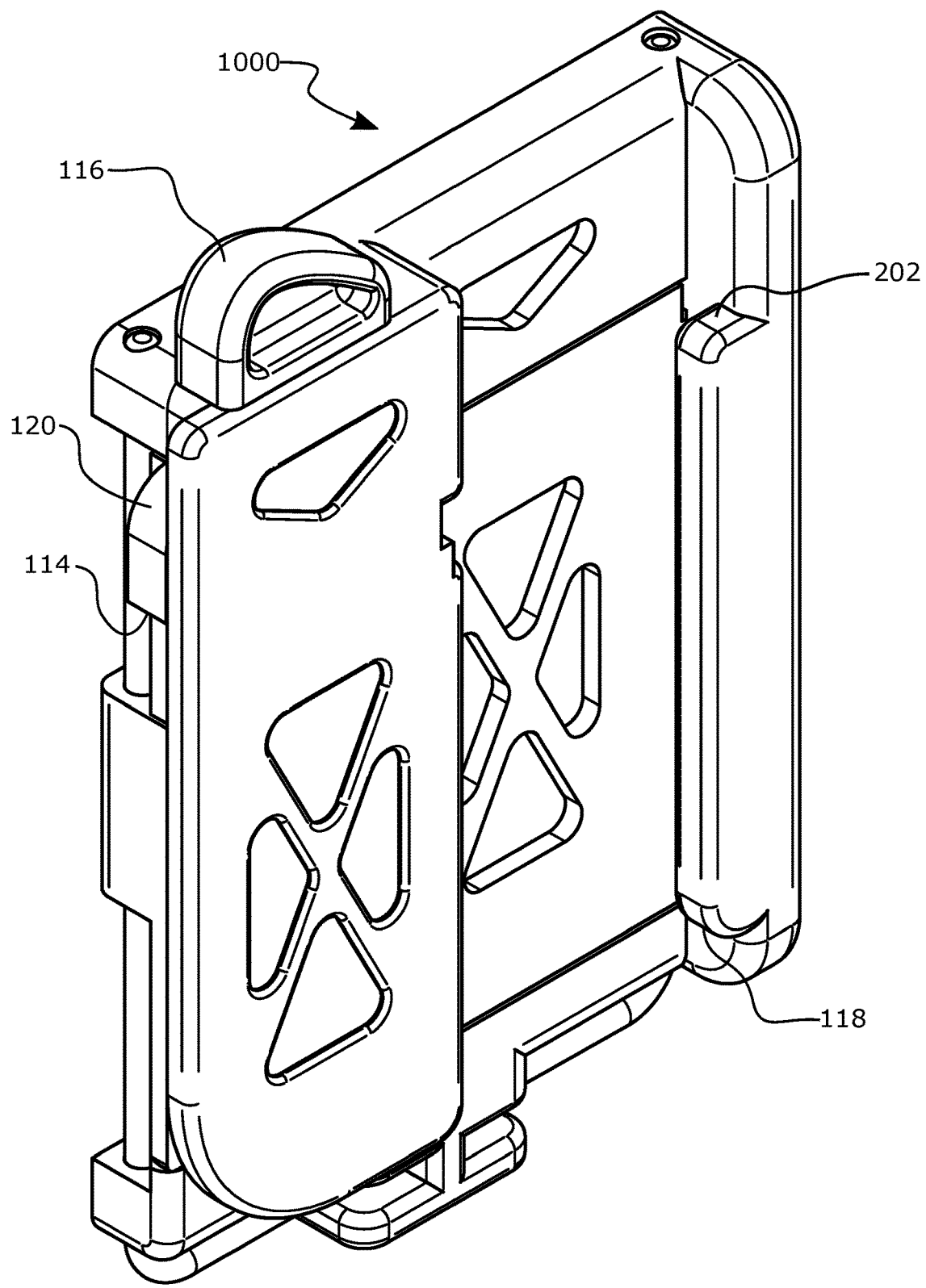

FIG. 11 shows an isometric view from the top of the second embodiment from another side.

Figure 12:
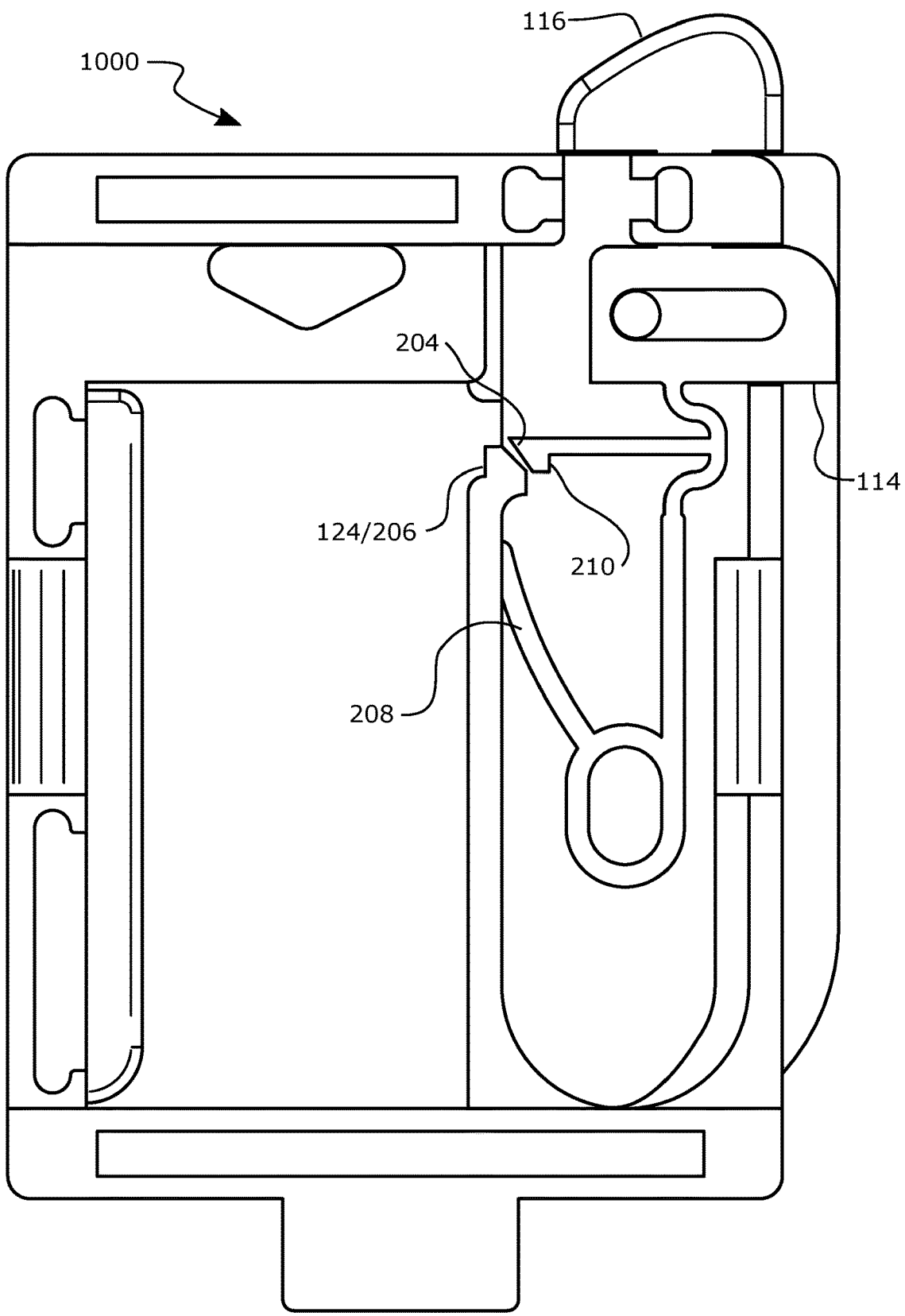

FIG. 12 shows a back view of the second embodiment with cover removed in the latched position.

Figure 13:
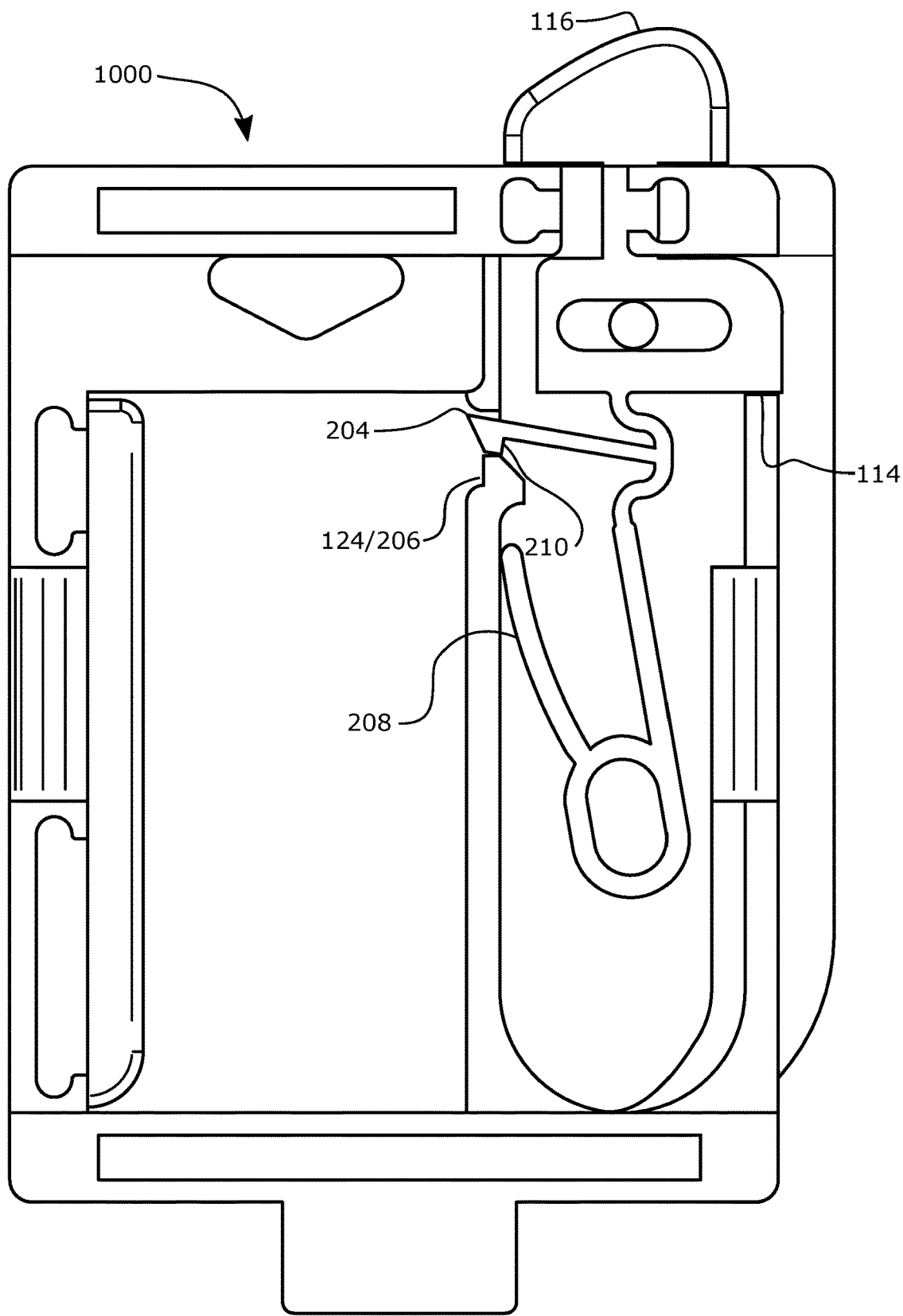

FIG. 13 shows a back view of the second embodiment with cover removed in the unlatched position.

Figure 14:
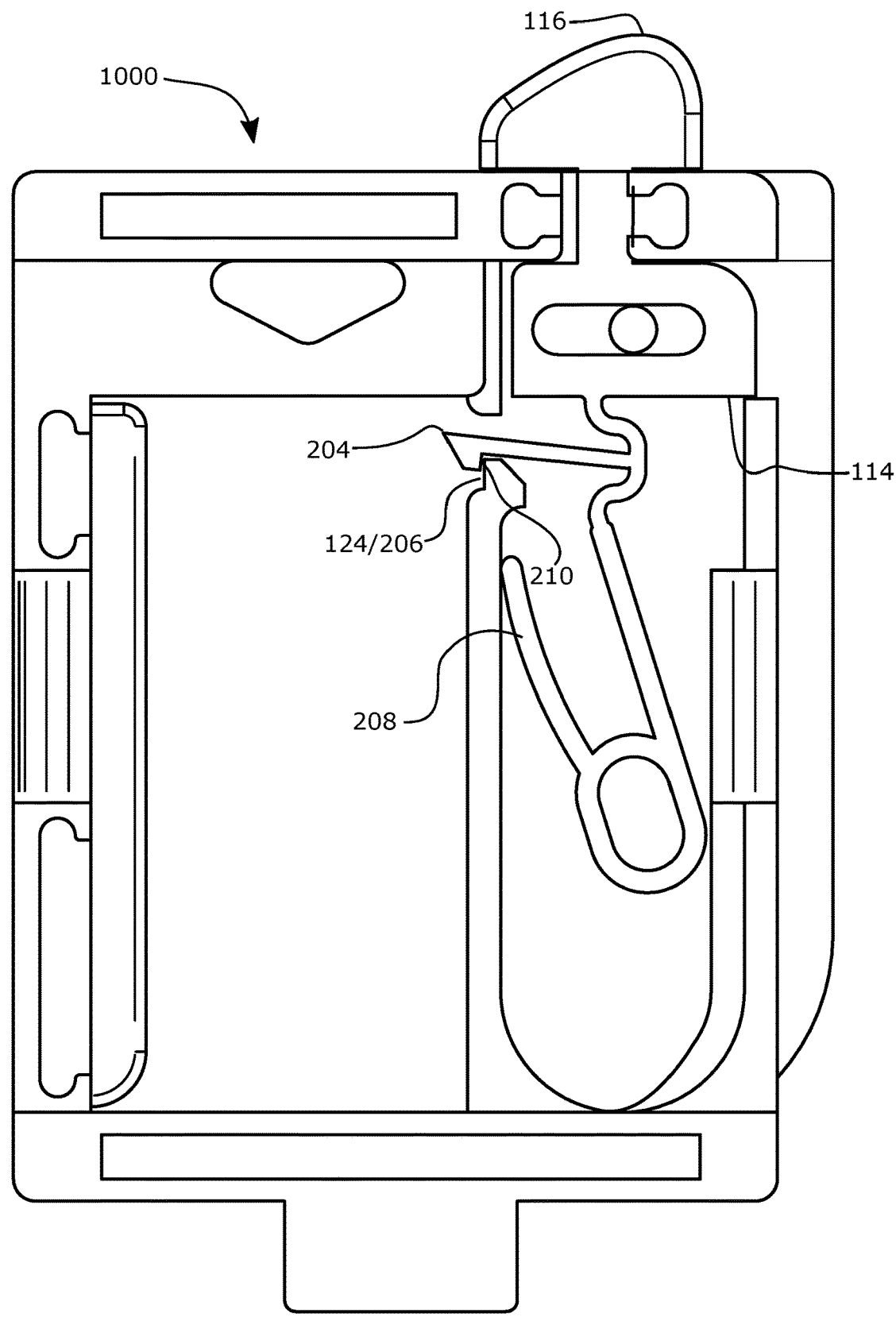

FIG. 14 shows a back view of the second embodiment with cover removed in the unlatched locked position.

Figure 15:
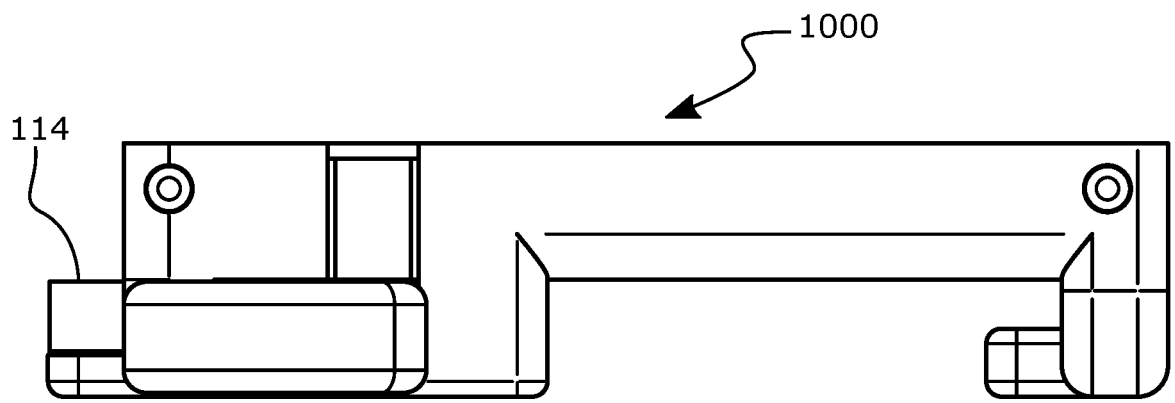

FIG. 15 shows a top view of the second embodiment in the latched position.

Figure 16:
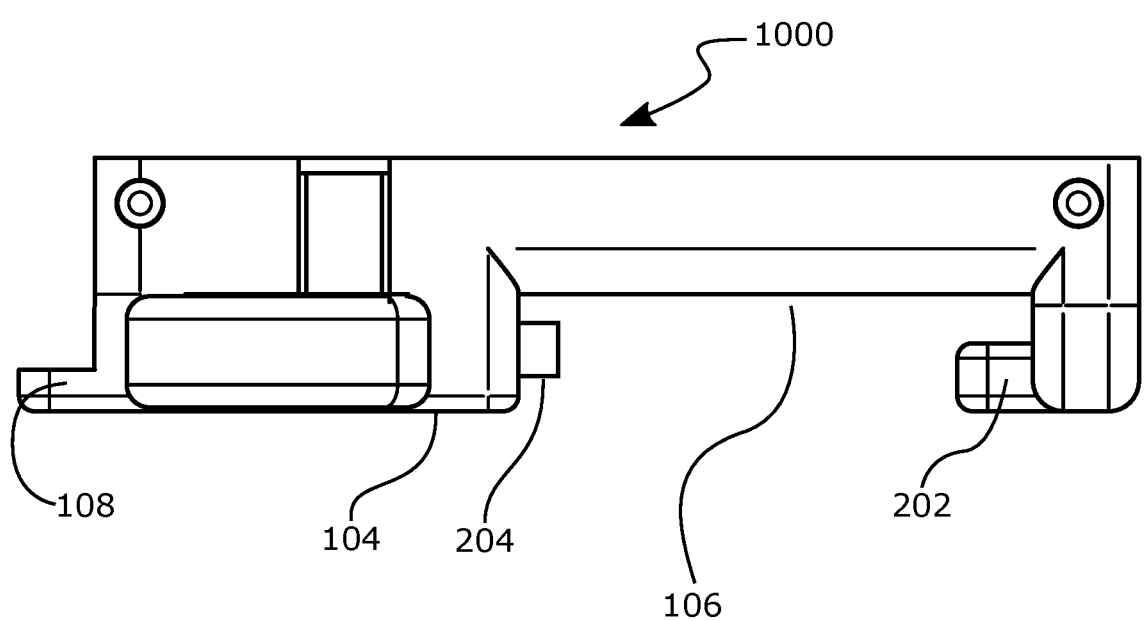

FIG. 16 shows a top view of the second embodiment in the unlatched position locked position.

Figure 17:
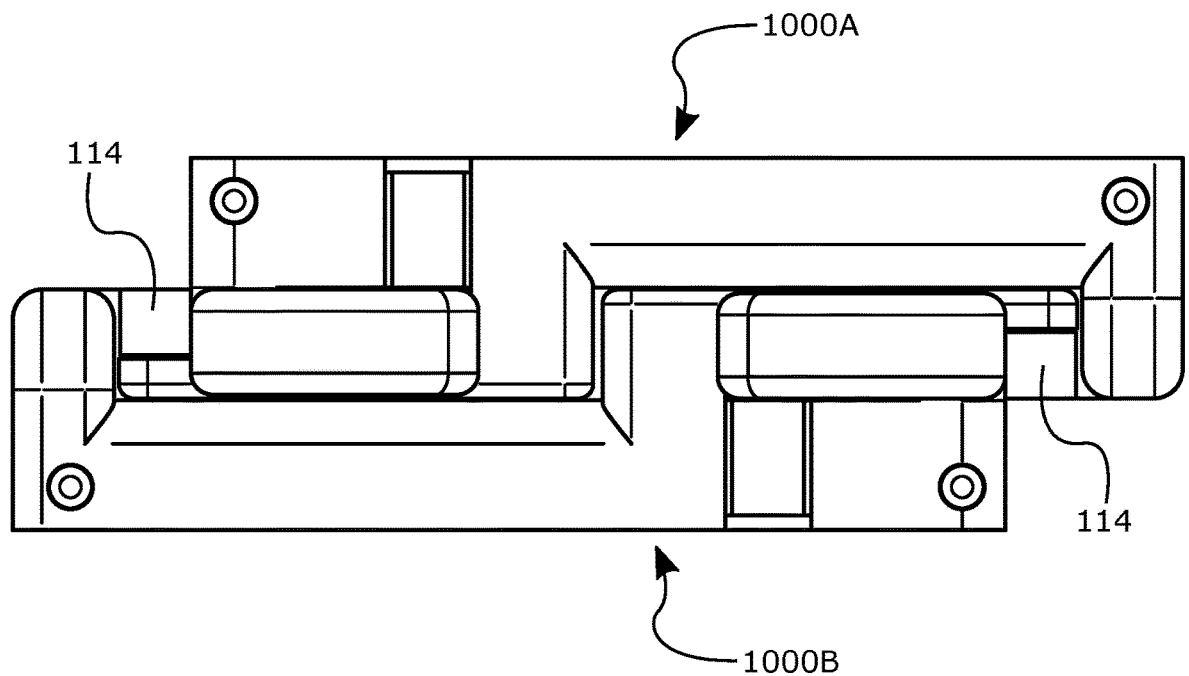

FIG. 17 shows a top view of the second embodiment with two slide connectors latched together.

Figure 17A:
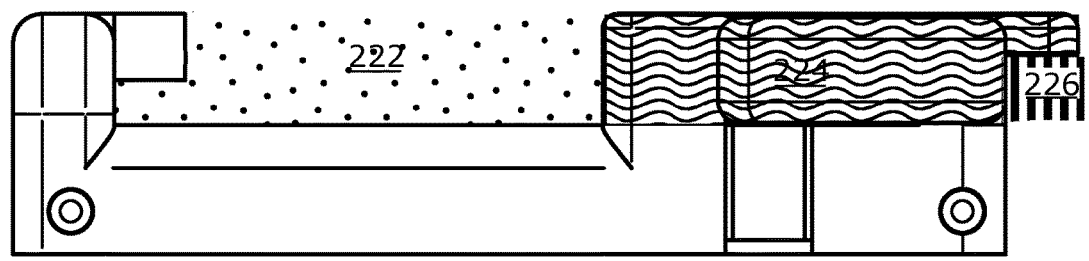

FIG. 17A shows view of the second embodiment track profile and rail profile.

Figure 18:
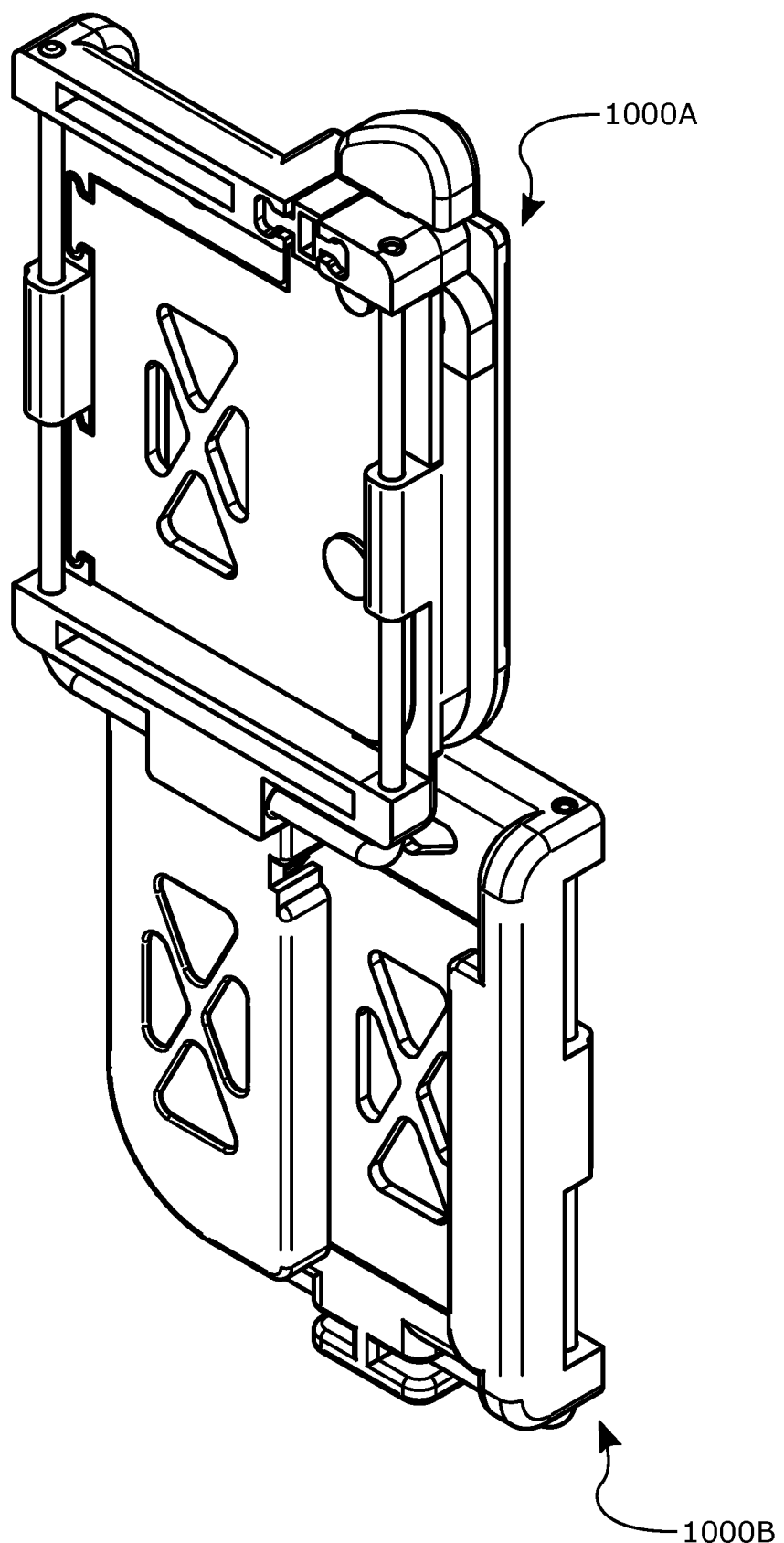

FIG. 18 shows the leading of one slide connector of the second embodiment into the another.

Figure 19:
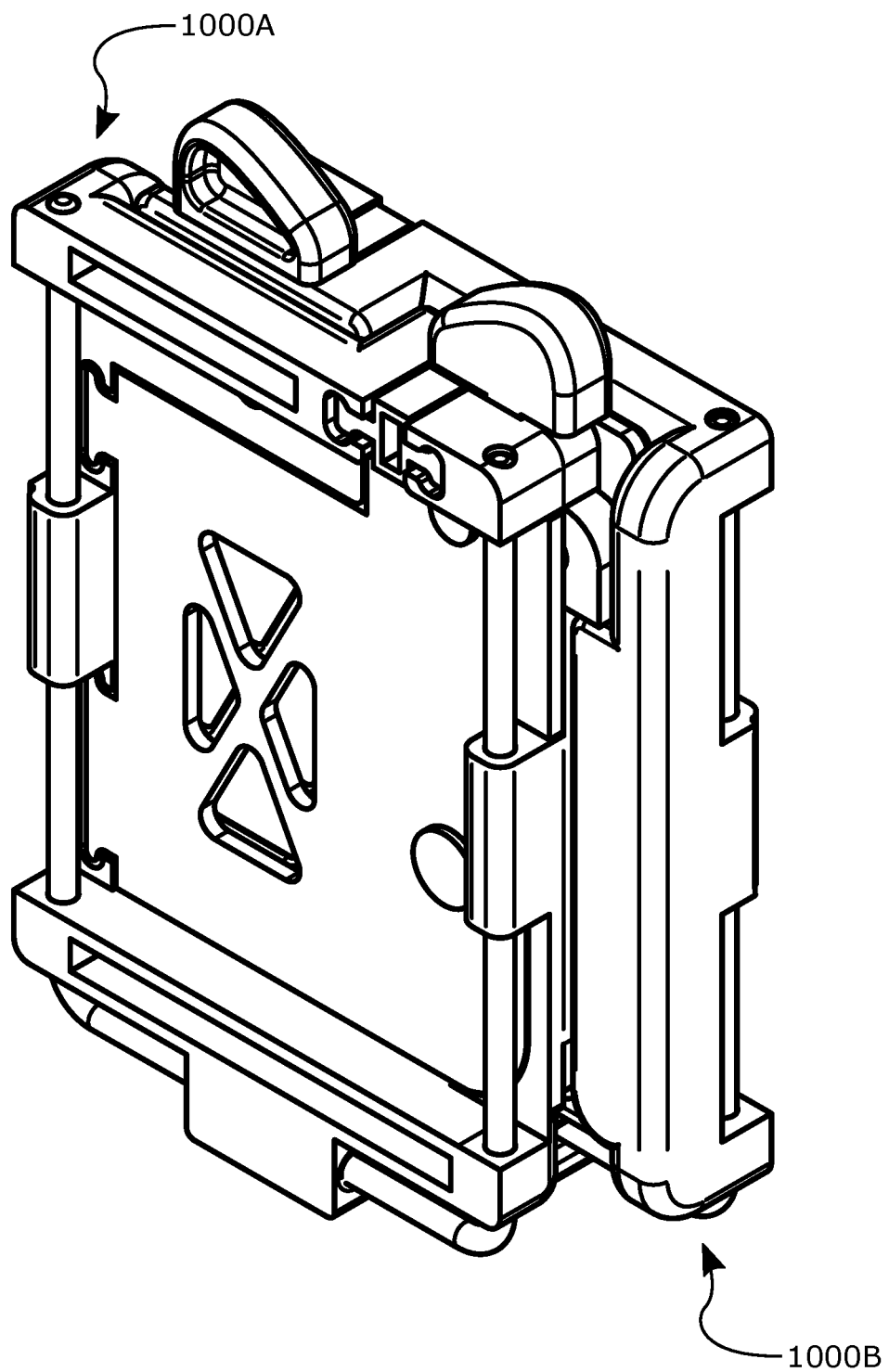

FIG. 19 shows the latching of one slide connector of the second embodiment into the another.

DRAWINGS-REFERENCE NUMERALS

| 100 | First embodiment connector | 102 | Track |
| 104 | Rail | 106 | Track channel |
| 108 | Rail lip | 110 | Track lip |
| 112 | Midplane | 114 | Latch |
| 116 | Latch handle | 118 | Connector lead-in |
| 120 | Latch lead-in | 122 | Example item |
| 124 | Latch release actuator | 202 | Latch catch |
| 204 | Latch release | 206 | Latch release catch |
| 208 | Latch spring | 210 | Latch holder |
| 212 | Connector back | 214 | Latch pivot |
| 216 | Latch assembly (first embodiment) | 222 | Track profile |
| 224 | Rail profile | 226 | Track lip channel |

DETAILED DESCRIPTION-FIRST EMBODIMENT: FIG. 1-FIG. 9

Figure 1:
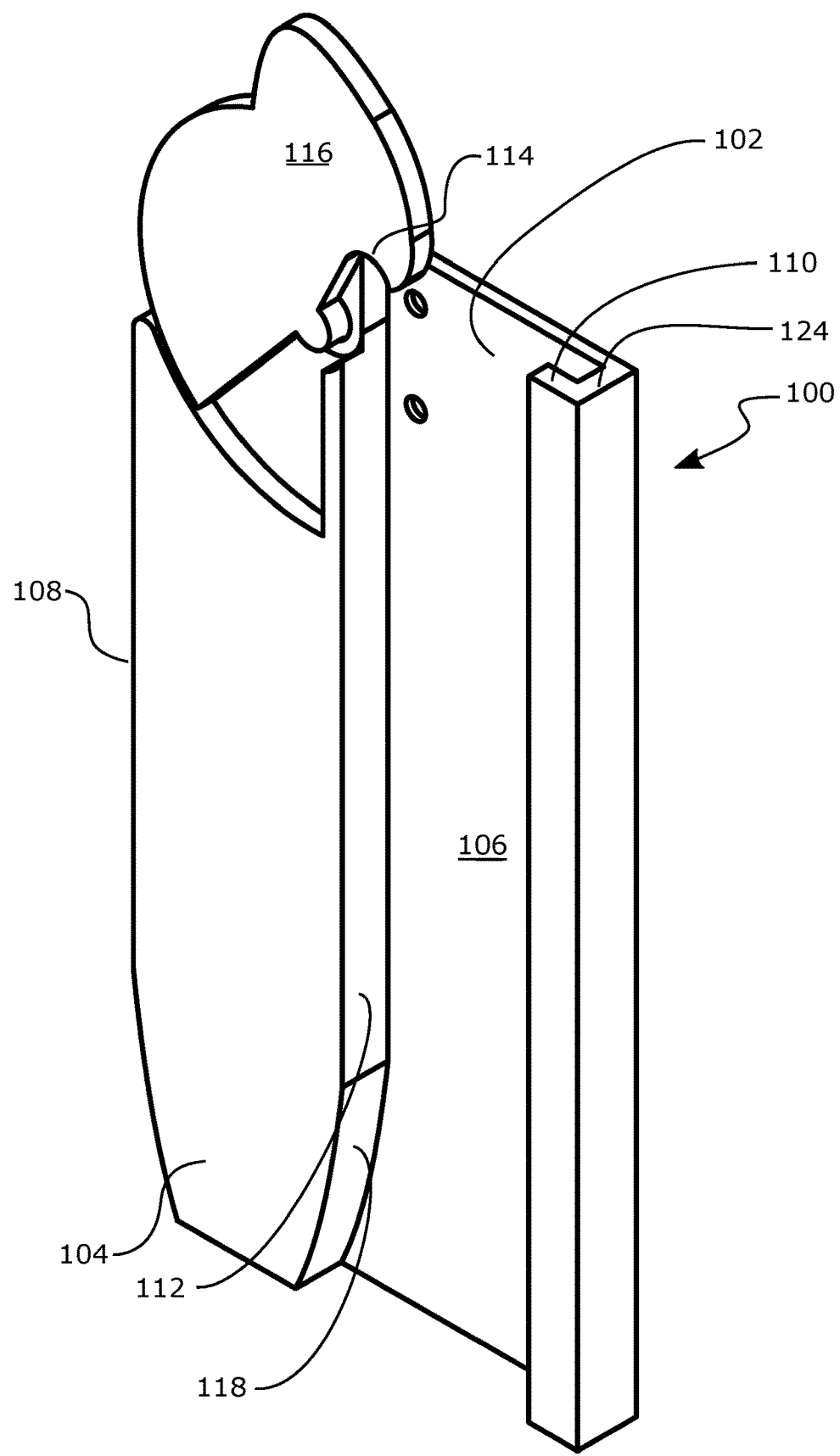
FIG. 1 shows an isometric view from the top of the first embodiment.

This first embodiment connector 100 is constructed of a rail 104 and a track 102 that are joined together as illustrated in FIG. 1. Track 102 features a track lip 110 that over hangs to the interior of the track 102 forming a track channel 106. Rail 104 also features a rail lip 108 that protrudes and can be best seen in FIG. 3. The width of the rail 104 is such that it can slide into track 102. Thus, when two identical first embodiment connectors 100 are facing each other, one can be slid into the other conjoining them axially. Track 102 is open on each end. The rail 104 features a latching mechanism which will be described in more detail later, that can collapse to within the thickness and width of the track profile 222. Therefore, two identical first embodiment connectors can be slid into each other from the top or the bottom of each other respectively. Connector lead-in 118 along with latch lead-in 120 aids in moving the latch mechanism out of the way as one first embodiment connector is inserted into another.

Figure 1A:
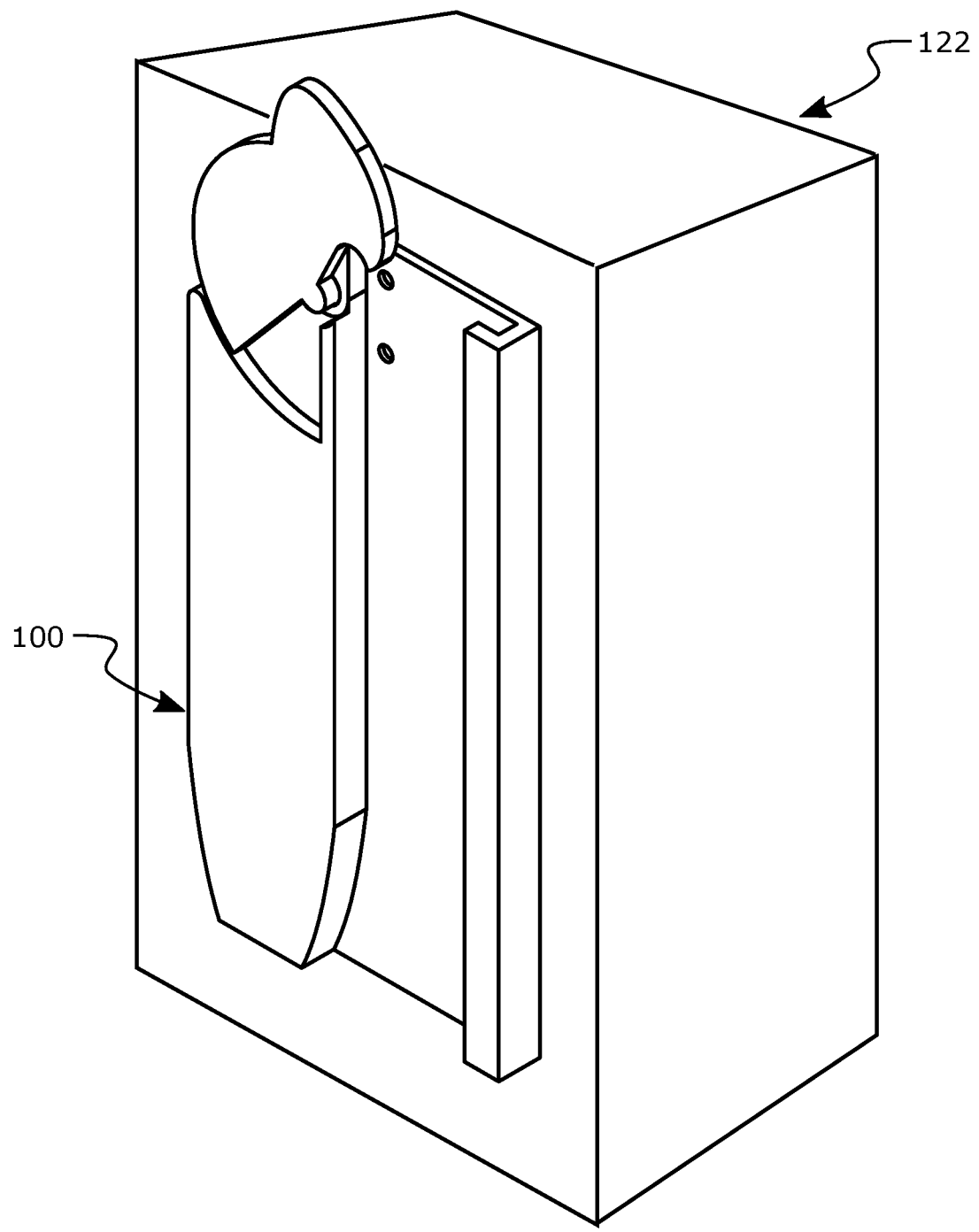
FIG. 1A shows the attachment of the first embodiment to an example item

FIG. 1A illustrates the first embodiment connector 100 attached to an example item 122. The attachment of first embodiment connector 100 could be accomplished by any known means such as pinning, bolting, sewing or other mechanical fastening techniques. The first embodiment connector 100 could also be fabricated into the design of the example item 122.

Figure 2:
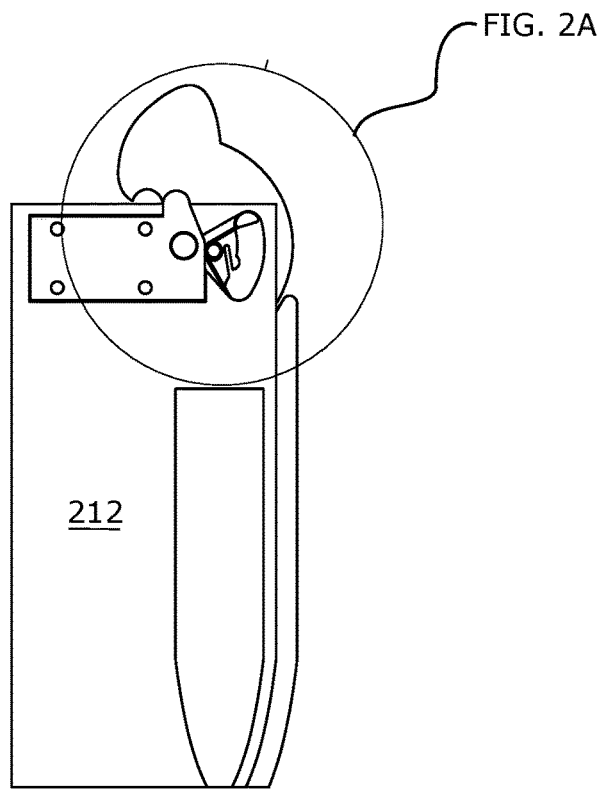
FIG. 2 shows a back view of the first embodiment.
Figure 2A:
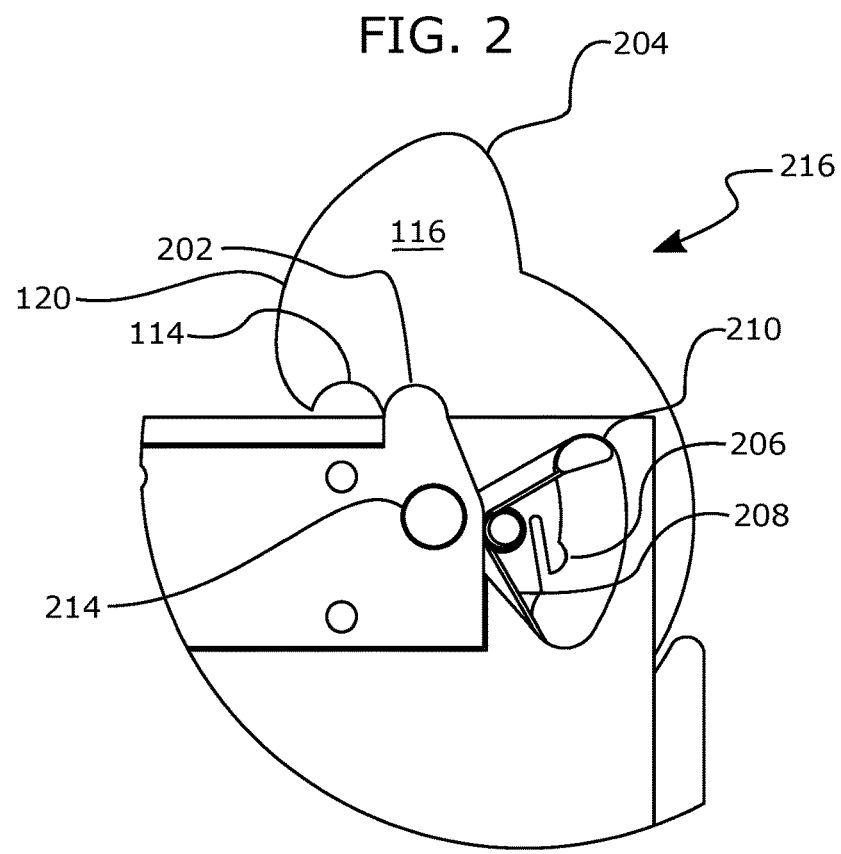
FIG. 2A shows a detail view of FIG. 2.

FIG. 2 shows a back view of the first embodiment connector. FIG. 2A is a detail view of the latch assembly in the latched position. Latch 114 is positioned such that it will catch the latch catch 202 of an identical first embodiment connector when slid together. Latch handle 116 rotates about the latch pivot 214 which moves the latch away from the track profile 222 opening allowing for a rail 104 of an identical first embodiment connector to be inserted in to the track 102. This situation is the unlatched position. In the unlatched position latch holder 210 has not advanced past latch release catch 206. In the unlatched position spring 208 returns the latch handle 116 back to the latched position when latch handle 116 is released by the user. When latch handle 116 is rotated past the unlatched position, latch release catch 206 captures latch holder 210. Latch handle 116 will stay in position when released by user. This is the unlatched locked position. In the unlatched locked position latch release 204 protrudes into the track lip channel 226 where an identical first embodiment connector latch release actuator 124 would travel thus moving the opposite connector's latch release 204 which in turn would position the opposite connector in the unlatched condition. FIG. 4 and FIG. 4A show the front and back of the first embodiment connector in the latched position. FIG. 5 and FIG. 5A show the front and back of the first embodiment connector in the unlatched position. FIG. 6 and FIG. 6A show the front and back of the first embodiment connector in the unlatched locked position.

FIG. 7 illustrates first embodiment connector as it's being inserted into another. The rail 104 of 100A moves the latch handle 116 of 100B to the unlatched position as the connectors are being slid together. Latch handle 116 and latch 114 of 100B fit within the track profile 222 of 100A. Latch 114 of 100A is in the latch position. Continuing to slide the connectors together will eventually place the latch catch 202 of 100B on latch 114 of 100A. At that point latch handle 116 of 100B will be unrestrained and latch spring 208 will push latch handle 116 into the latched position. Thus, 100A will prevent 100B from advancing up and 100B will prevent 100A from advancing down locking the two assemblies together as shown if FIG. 8.

FIG. 9 shows two identical first embodiment connectors latched together and section line AA. FIG. 9A is a section view AA and shows how two identical first embodiment connectors would fit together.

It should be pointed out that the connector back 212 can be connected or fastened to any object by conventional means. Thus, enabling the object to be connected to another object with an identical first embodiment connector attached to it.

OPERATION-FIRST EMBODIMENT: FIG. 7-FIG. 8

Starting with two first embodiment connectors in the latched position, align the rail 104 of the first connector 100A with the track 102 of the second connector 100B. Slide 100A into 100B as illustrated in FIG. 7. The latch handle 116 of 100B will be moved to the unlatched position by connector lead-in 118 of 100A in combination with latch lead-in 120 of 100B. Continue sliding the first connector 100A into the second connector 100B until the advancement is stopped when the latch catch 202 of 100B hits the latch 114 of 100A. At that point latch handle 116 of 100B clears track profile 222 of 100A where latch spring 208 of 100B advances latch handle 116 of 100B to the latched position thus locking 100B from sliding back out. Thus, 100A and 100B are locked together.

Note, since both connectors are identical it does not matter which connector is slid into the other. FIG. 8 illustrates how two first embodiment connectors would look locked together.

To release the connectors, move the latch handle 116 of either connector to either the unlatched or unlatched locked position. Slide the connector that was unlatched down relative to the other connector. Continue sliding the connector down until it is free from the other connector. Note, if the latch handle 116 is moved to the unlatched locked position it will stay in this position without being held by the user until the unlatched connector is slid down to the point at which the latch release 204 is moved by the latch release actuator 124 of the other connector to the unlatched position. This allows the user to unlatch and lock the connector and let go. This enables one-hand operation since the user can use one hand to unlatch and lock the latch handle 116, then let go and use the same hand to pull the connectors apart.

The unlatched locked feature is also advantageous in the case where multiple sets of connectors are used together when extra connection strength or load distribution is needed. Multiple connector pairs of this embodiment could be aligned in parallel and engaged together. To disengage multiple sets of connectors, the user would unlatch and lock all the pairs and pull them apart simultaneously. Each pair would be automatically moved to the unlatch position during the removal, then to the latched position when completely freed. Thus, multiple connectors being operated with one hand.

DETAILED DESCRIPTION-SECOND
EMBODIMENT: FIG. 10-FIG. 14

FIG. 10 illustrates a second embodiment connector 1000. This embodiment has many of the same features as the first embodiment, however the latching features are located on the outer edge of the apparatus, where as in the first embodiment the latching features were located near the midplane 112. Another difference is the movement of the latching components are in a linear direction, whereas the latching components of the first embodiment are on a pivoting or rotating movement. FIG. 11 shows the second embodiment including latch 114 and latch catch 202. The position of latch 114 is located at a level just slightly above latch catch 202. Same as the first embodiment, latch 114 and latch catch 202 are positioned to intercept the complimentary latch catch 202 and latch 114 on a mating connector.

FIG. 12, FIG. 13, and FIG. 14 shows the second embodiment connector in the latched, unlatched and unlatched locked positions respectively. In the unlatched position, the latch 114 is out of the path of track lip 110 of a mating connector allowing two connectors to slide together. In the unlatched locked position, the latch handle 116 can be released by the user and the connector will remain in the unlatched locked position due to latch holder 210 being hooked on latch release catch 206. Latch release catch 206 also acts as the latch release actuator 124 and provides a space for the latch release 204 on the opposing or other connector when two connectors are fully engaged together allowing the opposing connector to be placed in the unlatched locked position.

FIG. 15 shows a top view of the second embodiment in the latched position. FIG. 16 shows a top view of the second embodiment in the unlatched locked position. Note latch release 204 protruding into track profile 222.

FIG. 17 shows a top view of two connectors 1000A and 1000B of the second embodiment fully engaged together. Both latches 114 are above the latch catches 202 of the opposite connector thereby one latch 114 and latch catch 202 pair preventing 1000B from moving up (out of the page) and the other latch 114 and latch catch 202 pair preventing 1000A from moving down (into the page) thus locking the two connectors together.

OPERATION-SECOND EMBODIMENT: FIG.
18-FIG. 19

The operation of the second embodiment is similar to the first embodiment with the exception of the location of the latching components. In this embodiment, when second embodiment 1000A is inserted into the second embodiment 1000B, the latch handle 116 of 1000B is moved to the unlatched position by means of the connector lead-in 118 of 1000A being rounded or tapered in conjunction with the rounded or tapered shape of latch lead-in 120 of 1000B. Latch 116 of 1000B will remain in the unlatched position while 1000A and 1000B are being slid together. 1000A will slide into 1000B until 1000A's latch 114 engages 1000B's latch catch 202. At which point 1000B's latch 114 will clear 1000A's latch catch 202. Latch spring 208 of 1000B will advance latch handle 116 of 1000B to the latched position thus locking 1000A and 1000B together.

To unlatch the connectors, the latch handle 116 of either connector is moved to the unlatched or unlatched locked position allowing the same connector to be slid downward in respect of the other connector. Note that if the latch handle 116 is moved to the unlatched locked position, the latch release 204 will move into the latch release actuator 124 area of the opposite connector. As the unlatched locked connecter is moved down, latch release actuator 124 of the opposite connector causes the latch holder 210 to be disengaged from latch release catch 206 thus causing the latch handle 116 to be moved to the unlatched position by latch spring 208 and will remain in the unlatched position until the unlatched connector's latch 114 clears the track lip of the other connector. At which time latch spring 208 will move the latch handle 116 to the latched position which will prepare it for the next latching operation.

As noted in the description of the first embodiment, this embodiment could be attached to an item by any known means. In this embodiment a structure of pins is shown to illustrate one possible connection means to an item.

ADVANTAGES

From the description above, a number of advantages of some embodiments of my hermaphroditic latching slide connector become evident:

(a) Provides a way to mechanically connect two items with identical connectors.

(b) Identical connectors can be slid together in either direction. This is an advantage in the case where one item with a connector has an obstacle blocking one of the connection directions.

(c) Multiple connector pairs can be used to add more support or strength to the connection of two or more items.

(d) Identical connectors allow a multitude of different connecting configurations that can be changed easily and quickly since any item in the configuration could be connected to another without concern of the connector type like in a male/female arrangement.

(e) The connectors can be unlatched by holding one of the connector's latch in the unlatched position, or by pushing it to the unlatched lock position. This allows one-handed operation even if more than one connector pair is used to connect items together.

CONCLUSION, RAMIFICATIONS, AND SCOPE

Accordingly, the reader will see that the hermaphroditic latching slide connector of the various embodiments can be used to connect items together mechanically without concern of the gender of the connector, but unlike other prior art, has unique features that provide for bi-directional engagement and locking methods that allow for one-handed operation.

Although the description above contains many specificities, these should not be construed as limiting the scope of the embodiments but as merely providing illustrations of some of the several embodiments. For example, the material used in construction could be any structurally suitable material such as plastic, glass, metal, wood etc. The size of the connector can be made suitable for the intended application. As seen from the embodiments described, the width and length of the connector could be adjusted to meet the requirements of the application. For example, a micro connector sized for a watch attachment could be realized or a much larger connector sized for connecting shipping containers for freight could be realized. Furthermore, the latching features could be realized with different motions and or shapes than described in the embodiments as long as they provide the same functionality described in the embodiments. Should also be noted that the connection means of the embodiments to an item can be accomplished by any known means such as strapping, adhesives, mechanical fasteners, hooks, welding, sewing, hook and loop or built integral to the item.

Thus, the scope of the embodiments should be determined by the appended claims and their legal equivalents, rather than by the examples given.

I claim:
1. A mechanical connector, comprising:
   (a) a track comprising a track channel formed by a track lip cantilevered over said track channel,
   (b) a rail comprising a track lip channel form by a rail lip cantilevered out from said rail coplanar to surface of said rail,
   (c) a latch,
   (d) a latch catch,
   (e) a latch spring,
   (f) a latch handle,
   (g) a latch lead-in,
   (h) a connector lead-in,
   (i) said track channel interior path profile is shaped to accept the full said rail exterior path profile plus tolerance for a sliding fit thus forming a track profile and a rail profile,
   (j) said track and said rail are mounted to a connector back,
   (k) said track and said rail are connected parallel and coplanar to each other along said track's side opposite of said track lip and said rail's side opposite of said rail lip thus forming a longitudinal hermaphroditic pathway with a midplane between said track profile and said rail profile,
   (l) said longitudinal hermaphroditic pathway is of sufficient length to provide adequate structural strength when conjoined with an identical said longitudinal hermaphroditic pathway,
   (m) said latch is mounted within said rail profile by mechanical means that allow said latch to transverse from within said rail profile establishing an unlatched position to either the said track profile or said track lip channel wherein establishing a latched position,
   (n) said latch spring biases said latch in said latched position,
   (o) said latch catch is mechanically affixed to the end of said track or said rail outside of said track profile at the same end of said longitudinal hermaphroditic pathway as said latch,
   (p) said latch catch is located at a mirrored position of said midplane of said latch,
   (q) said latch catch is located at a distance along the said longitudinal hermaphroditic pathway as said latch plus tolerance when said latch is in said latched position,
   (r) said latch handle is mechanically linked to said latch,
   (s) said latch transitions from said latched position to said unlatched position by moving said latch handle wherein said latch catch is not obstructed by said latch and said latch and said latch handle are passable through said track profile,
   (t) said connector lead-in and said latch lead-in is formed by tapering or rounding the feature or features of said rail, said track and or said latch to provide a means of transitional movement of said latch to said unlatched position when an identical mechanical connector is slid into said mechanical connector,
   (u) whereby allowing two said identical mechanical connectors to be connected by sliding one into the other in either direction whereas the inserted mechanical connector causes the transitional movement of the other mechanical connector's said latch from the said latched position to said unlatched position and remaining so until the said inserted mechanical connector's said latch catch is slightly past the location of said other mechanical connector's said latch and said inserted mechanical connector's said latch is slightly before said other mechanical connector's said latch catch thus allowing said latch spring of said other mechanical connector to transition said latch to the said latched position thus locking the two said mechanical connectors together between the said latch and said latch catch of each said mechanical connectors forming a latched connector pair wherein said latched mechanical connector pair can be unlatched from one another by moving the said latch handle of either said mechanical connectors to the unlatched position to allow the unlatched mechanical connector to be moved past the latched mechanical connector wherein the said latch of the said unlatched mechanical connector's said latch is held in said unlatched position by the said track profile of the said latched mechanical connector and wherein said latch handle can be released for the remainder of the disengagement wherein when said unlatched mechanical connector's latch has traveled past said track profile of said latched mechanical connector wherein said latch spring of the unlatched mechanical connector moves said latch to the said latched position whereby preparing said unlatched mechanical connector for the next engagement operation.

2. The mechanical connector of claim 1, wherein
   (a) a latch holder is connected to said latch,
   (b) a latch release is connected to said latch,
   (c) said latch release, said latch holder and said latch fit within said rail profile,
   (d) a latch release catch is positioned to accept said latch holder when said latch is positioned past the said unlatched position thus locking the latch in the unlatched locked position,
   (e) said latch release feature is sized and shaped to encroach on the opposite side of said rail from said latch and into said track profile or said track lip channel when said latch is in the said unlatched locked position,
   (f) a latch release actuator feature is established opposite said latch release such that it allows for the encroachment of said latch release of said identical mechanical connector when said identical mechanical connector is in said latched mechanical connector pair configuration and said latch of said identical mechanical connector is positioned to said latched locked position wherein furthermore said latch release actuator provides a feature to move the said latch release from said latch release catch of said identical mechanical connector when said identical mechanical connector is slid from said latched mechanical connector pair configuration thus moving the said latch of the said identical mechanical connector to the said unlatched position, (g) whereby allowing the said latch of either said mechanical connectors is said latched mechanical connector pair configuration to be positioned to said unlatched locked position wherein disengagement of an unlatched locked mechanical connector causes the said latch release actuator to unlatch said latch release from said latch release catch of said unlatched locked mechanical connector enabling said latch spring of said unlatched locked mechanical connector to move said latch of said unlatched locked mechanical connector to said unlatched position wherein enabling further disengagement of said mechanical connectors.

\* \* \* \* \*